United States Patent Office 3,574,726
Patented Apr. 13, 1971

3,574,726
ESTER-ETHER INTERCHANGE REACTIONS
Walter Theodore Dent, Norton-on-Tees, England, assignor to Imperial Chemical Industries Limited, London, England
No Drawing. Filed Nov. 21, 1966, Ser. No. 595,594
Claims priority, application Great Britain, Nov. 24, 1965, 49,943/65
Int. Cl. C07c 65/06, 65/14
U.S. Cl. 260—520       9 Claims

ABSTRACT OF THE DISCLOSURE

A potassium salt of an ether of a para-hydroxy benzoic acid is produced by heating a potassium salt of an ester of an alcohol and para-hydroxy benzoic acid.

---

This invention relates to ester-ether interchange reactions.

According to the invention a potassium salt of an ether of a parahydroxy benzoic acid is produced by heating a potassium salt of an ester of an alcohol and parahydroxy benzoic acid or an alkyl or alkoxy substituted parahydroxy benzoic acid. Preferably a potassium salt of an ester of parahydroxy benzoic acid is used.

The potassium salt of the ester may be produced in situ by heating the free ester with potassium hydroxide, potassium carbonate or potassium bicarbonate.

The alcohol may be a lower alcohol, for example a lower monohydric alcohol such as methanol or amyl alcohol; suitably however, it is a dihydric alcohol for example a lower dihydric alcohol having up to 7 carbon atoms, for example those of formula $HO(CH_2)_nOH$ in which $n$ is a whole number in the range of 2–6, or a lower glycol such as propylene glycol or butylene glycol. It is however preferably ethylene glycol.

It is preferred to heat the potassium salt of the ester under anhydrous conditions, but small quantities of water such as those resulting when the potassium salt of the ester is prepared in situ by heating the ester with for example potassium hydroxide, are easily tolerated. However, when the salt is formed in situ it is desirable to dry the product, for example by allowing the water vapour to escape from the system at an early stage in the heating process.

The process of this invention may, if desired, be carried out in the presence of an inert gas, for example carbon dioxide, suitably at a partial pressure of 50 to 250 atmospheres and preferably 70 to 120 atmospheres.

The reaction is advantageously carried out by heating the potassium salt of the ester, if it is a mono ester, to a temperature of 180 to 290° C.; usually the temperature is at most 270° C. and most commonly is in the range 220 to 240° C.; if it is a diester it is suitably heated to a temperature of at least 240° C. and preferably in the range of 250 to 290° C. The above temperatures are suitably maintained for at least 30 seconds and at most 15 minutes, and preferably at least 1 minute and at most 5 minutes. At lower temperatures longer reaction times are required. Prolonging the heating beyond the times indicated above has very little effect.

It is preferred to carry out the reaction in the absence of solvents.

The invention embraces the conversion of the potassium salts of esters of monohydric alcohols and of both mono- and di-esters of dihydric alcohols. Examples of such esters are hydroxy ethyl parahydroxy benzoate (which becomes rearranged to the potassium salt of para beta-hydroxyethoxy benzoic acid) and ethylene bis 1,2-(parahydroxy benzoate) (i.e. ethylene glycol di-p-hydroxybenzoate) which becomes rearranged to form the potassium salt of bis 1,2(paracarboxy phenoxy) ethane. The free ethers may be liberated from the potassium salts by acidification.

Difunctional materials which can be used in the manufacture of polyester fibres may be produced according to this invention.

EXAMPLE 1

Hydroxyethyl-p-hydroxybenzoate (4.56 g.) was heated with potassium carbonate (1.72 g.) to 230° C. for 3 minutes. There was an immediate loss of weight (1.05 g.). The solid product was dissolved in water (100 cc.) and washed with ether. Acidification of the aqueous layer with hydrochloric acid gave p-(β-hydroxyethoxy)benzoic acid (2.05 g.) melting point 172–175° C. (45% yield). Recrystallisation from toluene raised the melting point to 178–180° C., 99% of the material recrystallised being recovered.

A mixture (1.25 gm.) of phenoxy ethanol and phenol was recovered from the ether wash liquid by evaporation.

EXAMPLE 2

A mixture of 0.015 mole ethylene glycol di p-hydroxy benzoate and 0.015 mole potassium carbonate was heated at 250° to 260° C. for 3 minutes. There was a loss in weight of 1.35 gm. The cooled mixture was dissolved in water and the solution acidified with hydrochloric acid. After filtration and washing the solid thus obtained with 15 ml. ether and 20 ml. methanol, a residue of 1.2 gm. remained. This had a melting point (partial) of 230 to 270° C. and a final melting point, with massive sublimation, of 310 to 320° C. Sublimed material was identified as ethylene bis 1,2(parahydroxy benzoate), i.e. 4,4'-dicarboxy diphenoxy ethane. The ether and methanol washes contained 2.2 gm. and 0.1 gm. respectively of a mixture of unchanged ethylene glycol diester and the hydroxy ethyl ether of p-hydroxy benzoic acid. It is therefore evident that the main contaminant of the product is unchanged starting material.

EXAMPLE 3

Dipotassium ethylene glycol di p-hydroxy benzoate (2.45 g.) was heated for 1¼ hours at a temperature of 280–290° C. at a pressure of 20 mm. of mercury. The product was dissolved in water acidified with hydrochloric acid, neutralised with $NaHCO_3$, and extracted with ether, 0.5 g. of ethylene glycol di p-hydroxy benzoate being recovered from the ether layer. The aqueous layer was then acidified and filtered, giving 0.7 gm. of 4,4'-di-carboxy diphenoxy ethane as solid. The filtrate was then ether extracted and 0.15 g. of p-hydroxy benzoic acid recovered from the ether layer.

EXAMPLE 4

9.5 g. of potassium methyl p-hydroxy benzoate was heated at 280° C. for 1 hour, giving a product weighing 9.2 g. The product was dissolved in water, acidified with HCl, made alkaline with $NaHCO_3$, and extracted with ether. The aqueous layer was acidified with HCl and ether extraction of the precipitated solid gave 5.75 g. of p-anisic acid, melting point 180–182° C., representing a 75.7% yield.

I claim:

1. A process for producing a potassium salt of an ether having the formula

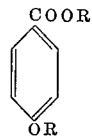

or the bis-ether thereof, wherein R is the ether residue of an alcohol selected from the group consisting of a monohydric alcohol of up to 5 carbon atoms and a dihydric alcohol having from 2 to 7 carbon atoms comprising heating a potassium salt of an ester of the formula

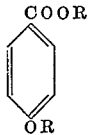

where R is as defined above, or the bis-ester thereof wherein R is the residue of the said dihydric alcohol.

2. A process according to claim 1 wherein the said potassium salt of the ester is produced in situ by heating a free ester of the formula

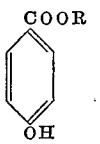

or the bis-ester thereof, where R is as defined in claim 1 with potassium hydroxide, carbonate or bicarbonate.

3. A process as claimed in claim 2 in which water vapour which is produced is allowed to escape from the system as vapour.

4. A process as claimed in claim 1 in which the dihydric alcohol is ethylene glycol.

5. A process as claimed in claim 1 in which the ester is a mono ester and heating is carried out at a temperature in the range of 180 to 290° C.

6. A process as claimed in claim 1 in which the ester is the bis diester and heating is carried out at a temperature in the range 240 to 290° C.

7. A process as claimed in claim 1 in which the heating is maintained for at least 30 seconds and at most 15 minutes.

8. A process according to claim 1 wherein the dihydric alcohol is propylene glycol.

9. A process according to claim 1 wherein the dihydric alcohol is butylene glycol.

References Cited

UNITED STATES PATENTS 2,855,419   10/1958   Reid et al.

OTHER REFERENCES

Morrison et al.: Organic Chemistry (1959) QD 251 M72 C-3. p. 335–6, 598.

LORRAINE A. WEINBERGER, Primary Examiner

E. J. GLEIMAN, Assistant Examiner

U.S. Cl. X.R.

260—521